United States Patent [19]

Kammerer

[11] Patent Number: 5,727,422
[45] Date of Patent: Mar. 17, 1998

[54] BACK DRIVE

[75] Inventor: Manfred Kammerer, St. Georgen, Germany

[73] Assignee: Deutsche-Thomson Brandt GmbH, Villingen-Schwenningen, Germany

[21] Appl. No.: 485,690

[22] Filed: Jun. 7, 1995

[30] Foreign Application Priority Data

Jun. 21, 1994 [DE] Germany .......................... 44 21 647.5

[51] Int. Cl.$^6$ ........................................... F16H 19/04
[52] U.S. Cl. ............................................ 74/89.17; 74/422
[58] Field of Search ........................ 74/422, 89.17

[56] References Cited

U.S. PATENT DOCUMENTS

| 315,051 | 4/1885 | Miller | 74/422 X |
|---|---|---|---|
| 489,846 | 1/1893 | Carmody | 74/89.17 |
| 548,801 | 10/1895 | Dobbel | 74/422 X |
| 3,004,443 | 10/1961 | Gerrans | 74/422 |
| 3,321,984 | 5/1967 | Nittka | 74/117 |
| 3,461,731 | 8/1969 | Lewis | 74/22 |
| 4,257,286 | 3/1981 | Ohyama | 74/422 |
| 4,669,328 | 6/1987 | Kishi et al. | 74/422 |
| 4,766,962 | 8/1988 | Frase | 74/422 X |

FOREIGN PATENT DOCUMENTS

| 0 356 984 | 3/1990 | European Pat. Off. . | |
|---|---|---|---|
| 26 49 661 | 12/1977 | Germany . | |
| 78 14 098 | 2/1982 | Germany . | |
| 84 26 064 | 1/1985 | Germany . | |
| 91 10 150 | 11/1991 | Germany . | |
| 42 31 761 | 3/1994 | Germany . | |
| 62-127557 | 11/1987 | Japan . | |
| 1-83969 | 7/1989 | Japan . | |
| 151667 | 10/1989 | U.S.S.R. | 74/422 |
| 2049097 | 12/1980 | United Kingdom . | |

OTHER PUBLICATIONS

DE search report P 44 21 647.5.

Primary Examiner—Allan D. Herrmann
Attorney, Agent, or Firm—Joseph S. Tripoli; Frederick A. Wein

[57] ABSTRACT

A rack drive contains a suspension tooth element which is formed by a rack which has a guide opening parallel to its row of teeth. The rack opening is guided on a bearing bolt of the drive pinion for the rack. The suspension tooth element is preferably connected via a drive pin to a device which can be variably positioned and is produced integrally from an acetyl polymer. The rack drive can advantageously be used as a positioning device for controlling a scanning and/or recording device in a recording and/or playback unit for optical recording media but is not limited to such.

5 Claims, 5 Drawing Sheets

BACK DRIVE

The present invention relates to a rack drive having means for backlash compensation between a rack and a gear wheel drive. The rack drive requires a small number of moldings and occupies a small amount of space, but nevertheless has high positioning accuracy which results in a small amount of play with little looseness between the rack and the gear wheel drive, and little friction between the rack and the gear wheel drive. The intended application is, in particular, for a positioning device in a recording and/or playback unit for optical recording media, e.g., CD's. However, the field of application is not limited to such field.

Means for tolerance compensation are required in order to achieve high positioning accuracy and to reduce play and looseness between a rack and a gear wheel drive since backlash results both from manufacturing tolerances of the individual parts and from an accumulation of tolerances between a bearing point of the rack and a bearing point of the drive pinion. A disc player having two racks, which are braced with respect to one another in a sprung manner for backlash compensation, is shown in EP 25 0356984 A2, in FIGS. 18–21. The known rack arrangement includes a fixed component of a scanning and/or recording device which slides on two guide rods so that, in addition, parallel alignment errors of the rack front from the guide cause changes in the separation between the rack and the drive gear wheel.

The abovementioned patent discloses the use of two racks, which are arranged parallel, or of a two-piece rack whose rows of teeth engage in a pinion or a gear wheel drive, the racks being braced with respect to one another by means of a spring in order to accommodate the teeth of the pinion or the gear wheel drive without play. The known rack arrangement comprises a first rack and a second rack which are braced with respect to one another by means of a spring. The first rack has T-shaped openings at its opposite ends, as well as a centrally arranged center opening, for accommodating the spring which braces the racks in a mutually sprung manner. The T-shaped openings have a constricted section which is intended for guiding and holding the second rack on latching tabs. The latching tabs of the second rack are provided in a manner corresponding to the T-shaped openings of the first rack. Furthermore, the first rack has a projection which is fitted with a pin, which is directed into the center opening, for holding a tension spring. The second rack also has a center opening and a projection which has a pin, which is directed into its center opening, for holding the spring. The second rack is assembled with the first rack in order to form the rack arrangement having backlash compensation. The latching tabs of the second rack are, for this purpose, passed through the T-shaped openings of the first rack, and the racks are braced with respect to one another by means of a spring. In order to move the rack arrangement into engagement with a gear wheel drive or a pinion, the tooth systems, which are present on the side surfaces of the racks, must be aligned with one another. To this end, the second rack is displaced against the spring in the longitudinal direction with respect to the first rack. The teeth of the drive gear wheel, and/or spur gear drive or drive pinion, are then clamped in by the rows of teeth of the racks, which are braced with respect to one another by means of a spring.

Although the clamping-in of the teeth of the spur gear drive between rows of teeth which are braced in a sprung manner leads provides a reduction in the backlash or the looseness between the rack and the gear wheel drive, it also produces disadvantageously high friction losses and consequently, an increased electrical power requirement. This is particularly disadvantageous for the life of the battery in transportable units which are operated independently of AC power. Furthermore, the assembly of the racks and of the rack drive of the prior art is a costly construction. As a result of the tolerance accumulation between the bearing point of the rack and the bearing point of the drive pinion, the individual parts must be produced with high accuracy despite the backlash compensation. Two racks are required and the racks have numerous moldings and a plurality of different contours. As a result, high production cost and complex tools are necessary.

An object of the present invention is therefore to provide a rack drive which has little backlash, requires a small number of individual parts and moldings, and occupies a small amount of space, but has high positioning accuracy of the drive as a result of a small amount of play with little looseness between the rack and the gear wheel drive, and with little friction, so as to overcome the disadvantages of the prior art solutions both in terms of assembly characteristics and in terms of the number and shapes of the moldings used.

This object is achieved, according to the present invention, in that the rack drive contains a suspension tooth element which is formed by a rack which has a guide opening parallel to its row of teeth, the guide opening being guided on a bearing bolt of the drive pinion for said rack with the suspension tooth element, preferably being connected via a driver pin to a device which can be positioned variably, and can be produced integrally from a plastic, such as acetyl polymer.

A suspension tooth element is used for backlash compensation, which suspension tooth element being formed by a rack which has a guide opening parallel to its row of teeth, the guide opening being guided on a bearing bolt of the drive pinion for said rack. Such a rack drive is preferably used as a positioning device for controlling a scanning and/or recording device in a recording and/or playback unit for optical recording media.

One aspect of the invention is to provide a rack drive which has a small amount of backlash and a small number of individual parts and moldings. To this end, the rack drive is provided with only one rack which is a component of a suspension tooth element. The rack drive, is having only one rack, nevertheless has high positioning accuracy of the drive as a result of a small amount of play and a small amount of looseness between the rack and the gear wheel drive, with little friction.

This is achieved in that the rack is guided as a component with the suspension tooth element directly on the shaft or on the bearing point of the drive gear wheel. As a consequence, the tolerance chain between the bearing point of the rack and the bearing point of the drive gear wheel is reduced, and a small amount of play and a small amount of looseness between the rack and the gear wheel drive are ensured even through only one rack or one suspension tooth element are provided. The teeth of the drive gear wheel are not clamped in, so that the rack drive has a small amount of friction. A second rack and the spring for bracing two racks are no longer required. The single rack or the suspension tooth element have a small number of moldings and can be produced as an integral part in terms of advantageous sliding characteristics, for example, from acetyl polymer. Since only one rack is required and the drive gear wheel as well as the rack have a common bearing point, special tooth systems, such as hybrid tooth forms for the drive gear wheel and the rack, for example, can be selected in order to further reduce rotation backlash. The assembly of a rack arrangement which comprises two racks and can be moved into engagement with a drive gear wheel by displacing its rows of teeth against a spring, is thus obviated.

The suspension tooth element comprises a rack which has a guide opening parallel to its row of teeth. A drive gear wheel engages with the teeth of the rack of the suspension tooth element in order to form the rack drive. A bearing bolt of the drive gear wheel is at the same time provided as a guide for the rack and the suspension tooth element. The guide opening of rack or of the suspension tooth element is arranged in such a manner that it rests against the bearing bolt during the engagement of the drive gear wheel in the rack, in order to prevent the drive gear wheel or the rack from being forced away and to prevent backlash during the movement or transmission of power between the rack and the drive gear wheel.

As a result of the rack being guided on the bearing bolt of the drive gear wheel, there is no longer any need for a two-piece rack arrangement having means for connection and displacement, as well as is means for mutual bracing, and the rack drive can be implemented so that it occupies a small amount of space. As a result of the small amount of space occupied, the use of the rack drive is particularly advantageous for positioning devices in transportable recording and/or playback units for optical recording media, such as for controlling a scanning and/or recording device, for example. The use is, however, not restricted to such an application.

The rack or the suspension tooth element of the present invention is connected via a driver pin to the scanning and/or recording device, which is also designated as a so-called pick-up in this case, so that the parallel alignment is to be ensured with high accuracy between the rack front and the guide rod, and the guide elements of the scanning and/or recording device are unnecessary. The driver pin and a hole which accommodates the driver pin can optionally be provided on the suspension tooth element or pick-up. This non-rigid connection of the rack to the scanning and/or recording device is a further means for reduction of the backlash between the rack and the drive gear wheel, which advantageously influences the use of only one rack for a rack drive having little backlash.

BRIEF DESCRIPTION OF THE DRAWINGS

The present invention is discussed in more detail hereinafter wherein reference may be had to the drawings in which.

DETAILED DESCRIPTION OF THE PREFERRED EMBODIMENT

Figure 1:
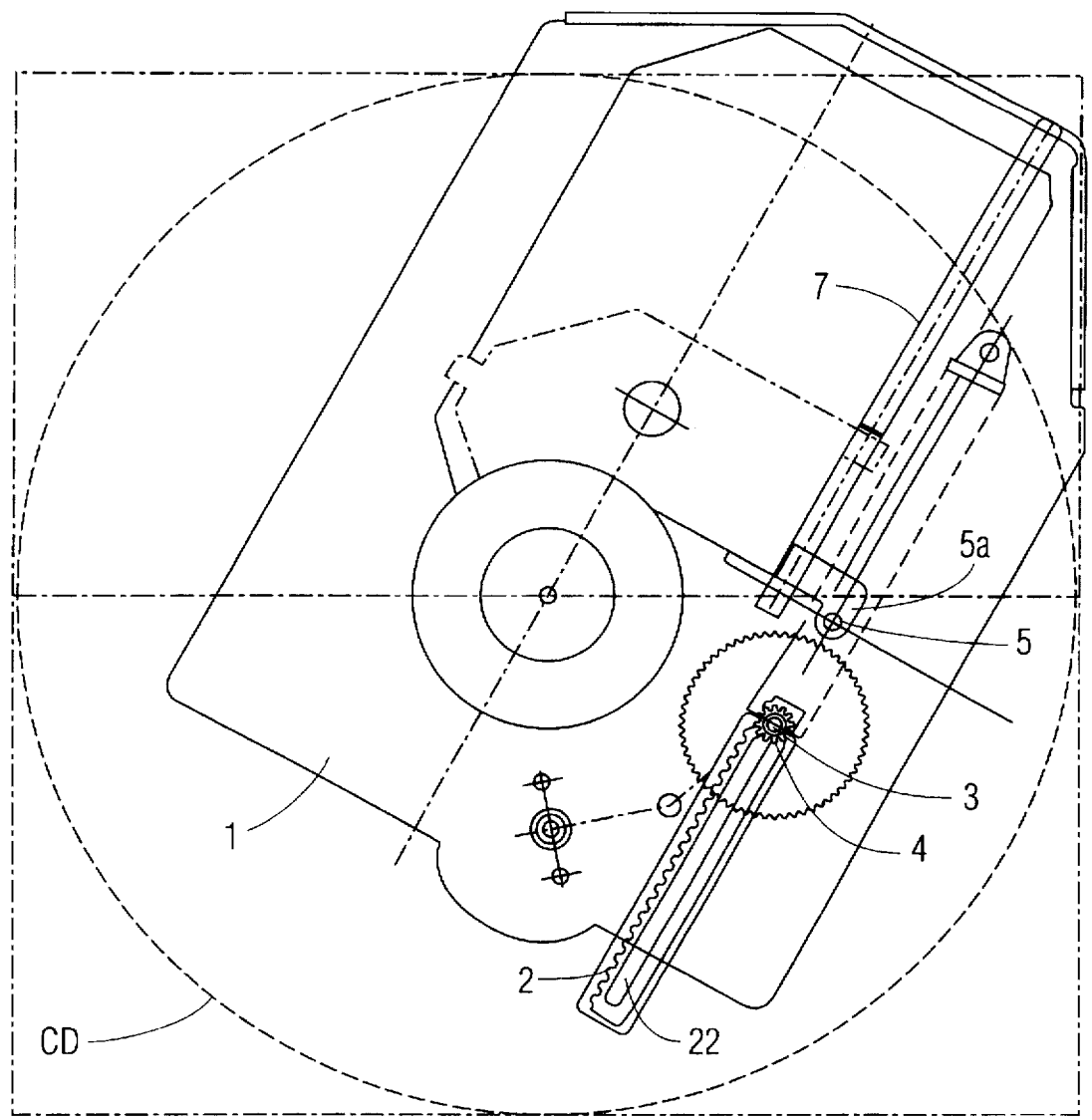
FIG. 1 shows relevant portions of a rack drive for a positioning device in a recording and/or playback unit for optical recording media.
Figure 2A:
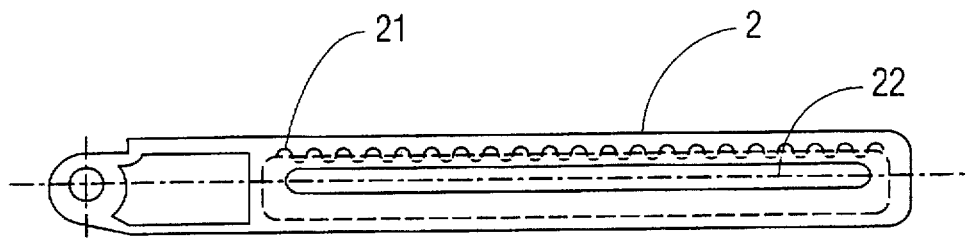
FIGS. 2a–2c show relevant portions of a rack, which is designed as a suspension tooth element, in three views.
Figure 2B:
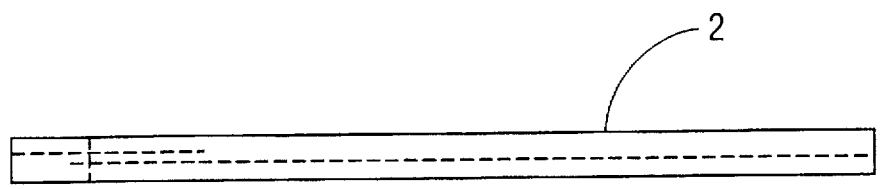
Figure 2C:
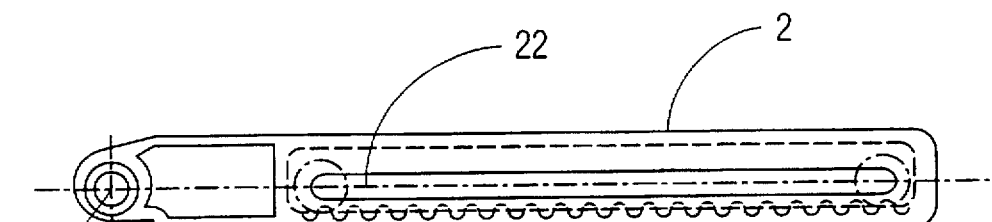

The rack drive, which is illustrated in FIG. 1, for a is positioning device in a recording and/or playback unit for optical recording media CD, is formed by a suspension tooth element 2 which is arranged such that it engages a drive pinion 4. The suspension tooth element preferably comprises, as its only component, a rack 21 having a guide opening 22, and is illustrated in FIGS. 2a–2c, in three views. The suspension tooth element 2, which forms rack 21 has means for backlash compensation, is preferably a plastic molding which is produced, for example, from acetyl polymer, and in accordance with FIGS. 2a–2c , has only a small number of moldings. Rack 21, or the suspension tooth element 2, has only one opening 6, as well as the row of teeth of rack 21 and a guide opening 22 which is in the form of a slot. This opening 6 is intended for the rotatable accommodation of a driver pin 5, which is illustrated in FIG. 1, via which the rack 21 or the suspension tooth element 2, which is connected to the scanning and/or recording device, also designated as a pick-up. The scanning and/or recording device 5a or the pick-up is arranged in a sliding manner on a guide rod 7 having guide elements and is positioned using the rack drive. As a result of this non-rigid connection of the rack 21 to the suspension tooth element 2, parallel alignment is ensured with high accuracy between the rack front of the rack 2 and the guide rod 7, and guide elements of the scanning and/or recording device 5a is unnecessary. As a result, requirements for the accuracy of individual part production can be made less stringent.

The rack drive has a small amount of backlash and which, despite having a small number of individual parts and moldings, as well as occupying a small amount of space, nevertheless has a high positioning accuracy with a very small amount of play or a small amount of looseness, as well as little friction, and overcomes the disadvantages of known solutions both in terms of its assembly characteristics and in terms of the number and shapes of the moldings used. This is achieved by a single rack 21 being provided, which includes a suspension tooth element 2, a guide opening 22, which is in the form of a slot with the suspension tooth element 2 being guided on a bearing bolt 3, which is illustrated in FIG. 1 and is preferably also fitted with the drive gear wheel or the drive pinion 4. Using the suspension tooth element 2, which forms both the row of teeth of the rack 2 and the guide opening 22, which is in the form of a slot for rack 2, a tolerance accumulation which builds up in the case of known rack drives with a spur gear drive. The present rack arrangement is thus is substantially reduced in size, so that less backlash occurs in the case of the present rack drive.

The rack drive is formed with one rack 2, so that it has a smaller number of individual parts and moldings. A spring, in addition to the second rack, is unnecessary. Since only one rack 2 is provided, only a small assembly cost is necessary. As a result rack 21 is guided on the bearing bolt 3 of the drive gearwheel or drive pinion 4, and a two-piece rack arrangement having means for connection and displacement, as well as means for mutual bracing, are no longer necessary. The rack drive can be implemented such that it occupies a small amount of space. As a result of the small amount of space occupied, the use of the rack drive is particularly advantageous for positioning devices in transportable recording and/or playback units for optical recording media, such as for controlling a scanning and/or recording device, for example. However, the use is not restricted to such an application, but extends to other linear drives which are intended to have a high positioning accuracy using simple means.

Figure 3:
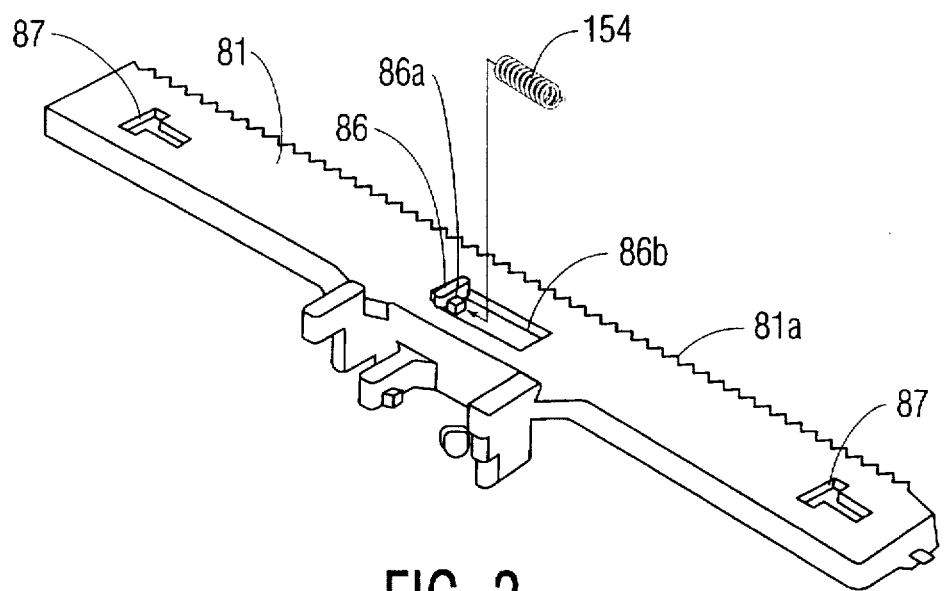
FIG. 3 shows a perspective illustration of a prior art first rack of a prior art rack arrangement.
Figure 4:
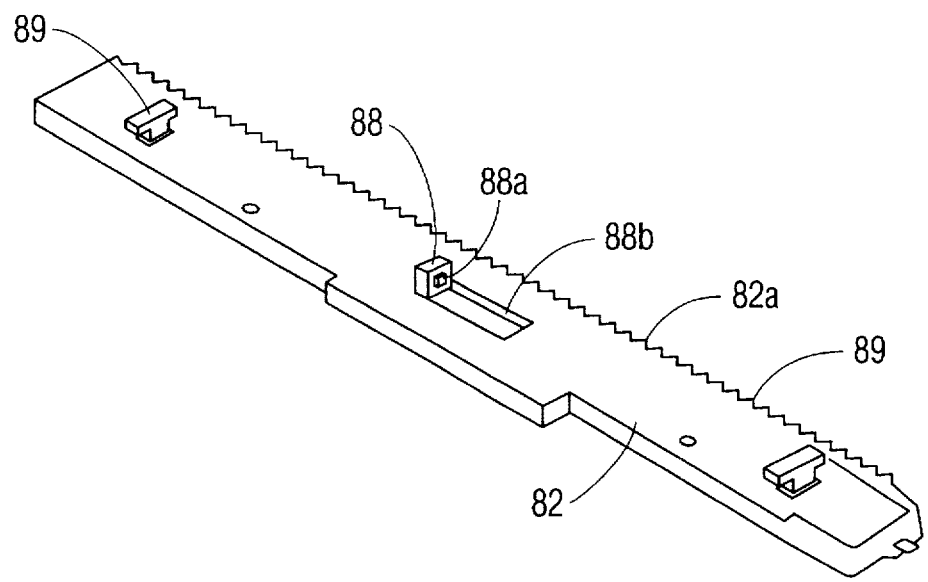
FIG. 4 shows a perspective illustration of a prior art second rack of the prior art rack arrangement.

FIGS. 3 and 4 relate to the prior art solution. This previous solution is disclosed in EP 03 56 984 A2 and present FIG.

3, corresponds essentially to FIG. 18 of the '984 reference, while present FIG. 4 corresponds to FIG. 19 of the '984 reference. The reference symbols of the known solution have therefore also been used in these figures.

As already indicated above, the rack arrangement which is known according to EP 0356984 A2, FIGS. 18 20, has for backlash compensation, two racks 81, 82 which are braced with respect to one another in a sprung manner by means of a spring 154. The first rack 81 has T-shaped openings 87 at its opposite ends, as well as a centrally arranged center opening 86b. The T-shaped openings 87 have a constricted section, which is intended for guiding the second guide rod 82 on latching tabs 89. T-shaped latching tabs 89 are provided on the second rack 82, corresponding to the T-shaped openings 87 of the first rack 81. Furthermore, first rack 81 has a projection 86 which is fitted with a quadrilateral pin 86a, which is directed into the center opening 86b, for holding the spring 154. The second rack 82 also as a center opening 88b and a projection 88, which has a quadrilateral pin 88a, which is directed into the center opening 88b, for holding the spring 154. In order to form the known rack arrangement having backlash compensation, the second rack, which is illustrated in FIG. 4, is rotated through 180° and is assembled with the first rack 81, which is is illustrated in FIG. 3. The latching tabs 89 are at the same time passed through the T-shaped openings 87 and the racks 81, 82 are braced with respect to one another by means of the spring 154.

In order to move the rack arrangement into engagement with a gear wheel drive or the pinion 59 which is illustrated in FIG. 21, the tooth systems 81a, 82a, which are present on the side surfaces of the racks 81, 82, must be aligned with one another. To this end, the second guide rod 82 is displaced against the spring 154 in the longitudinal direction with respect to the first rack 81. Since the second rack 82 is held by the first rack 81 only in the constricted section of the T-shaped opening 87, this frequently leads to the second rack 82 jumping out during the assembly process, which results in the complex assembly process being further exacerbated. Further, racks 81, 82 have numerous moldings, e.g., the T-shaped openings 87, the T-shaped latching tabs 89, the projections 86, 88, and the quadrilateral pins 86a and 88a including the center openings 86b and 88b. The known rack arrangement thus incurs a high production cost.

Figure 5:
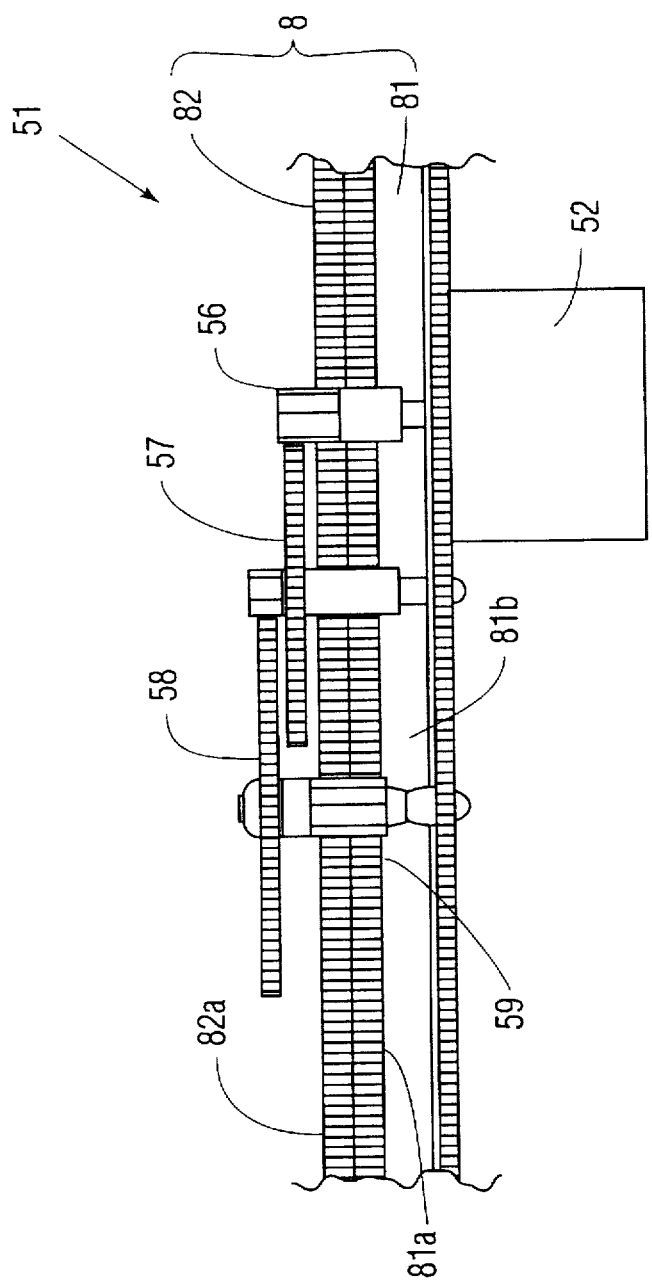
FIG. 5 shows a prior art rack arrangement having three rows of teeth for clamping in the teeth of a drive gear wheel.

FIG. 5 shows the known rack drive or transportation mechanism 51 for a pick-up which is formed by the two-piece rack 8 with a drive pinion 59 as a spur gear drive. The drive pinion 59 is in this case driven by a drive motor 52 via a first gearwheel 57 and a second gearwheel 58 from a gearwheel 56, which is mounted on the shaft of the drive motor 52, in order to achieve a matching of the feed rate of the rack drive to the motor rotation speed.

Figure 6:
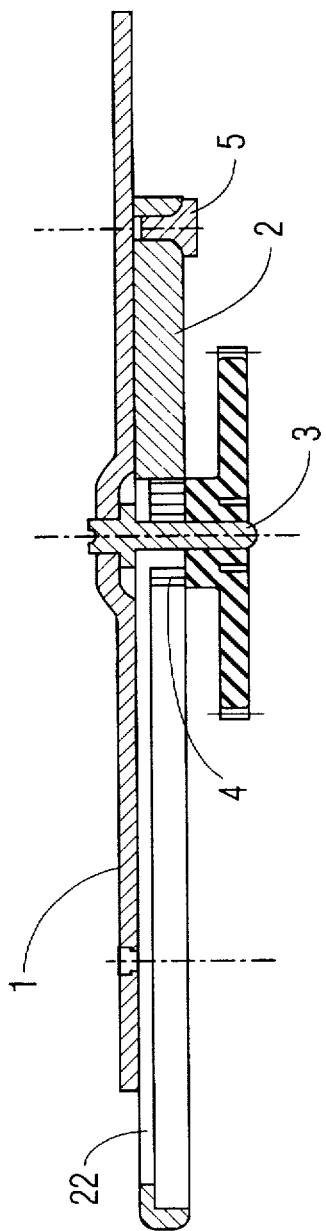
FIG. 6 shows relevant portions of a rack arrangement having a rack, which is designed as a suspension tooth element, for backlash compensation.

FIG. 6 shows the rack drive which is formed by a suspension tooth element 2, the bearing bolt 3 which guides the suspension tooth element 2 being accommodated by a base plate 1. According to FIG. 1, this base plate 1 is also fitted, via a guide rod 7, with the scanning and/or recording device which, according to FIG. 6, is connected to the suspension tooth element 2 via the driver pin 5. The rack drive, which is formed by the suspension tooth element 2, thus requires a small physical volume and, despite this small physical volume and the use of only one rack 21 as a component of a suspension tooth element 2, ensures high positioning accuracy with a result of a small amount of backlash.

I claim:

1. A rack drive having backlash compensation, wherein, the rack drive contains a suspension tooth element which is formed by a rack which has a guide opening parallel to a row of teeth, the guide opening being guided by a bearing bolt of a drive pinion for said rack, the suspension tooth element being of an integral design.

2. The rack drive according to claim 1 wherein the suspension tooth element is connected via a drive pin to a device which can be positioned variably.

3. The rack drive according to claim 1 wherein the suspension tooth element is produced from an acetyl polymer.

4. A rack drive having means for backlash compensation, comprising a suspension tooth element used for backlash compensation, the suspension tooth element being formed by a rack which has a guide opening parallel to its row of teeth, which guide opening being guided by a bearing bolt of a drive pinion for said rack.

5. A rack drive having means for backlash compensation, comprising a suspension tooth element which is formed by a rack which has a guide opening parallel to its row of teeth, the guide opening being guided by a bearing bolt of a drive pinion of said rack, said rack being a positioning device for one of controlling a scanning and a recording device in one of a recording and playback unit for optical recording media, the suspension tooth element being of an integral design.

* * * * *